United States Patent [19]

Cheung

[11] Patent Number: 5,329,843
[45] Date of Patent: Jul. 19, 1994

[54] CHERRY PITTER

[75] Inventor: Paul P. W. Cheung, Hong Kong, Hong Kong

[73] Assignee: Maxpat Trading & Marketing (Far East) Limited, Hong Kong

[21] Appl. No.: 928,514

[22] Filed: Aug. 11, 1992

[30] Foreign Application Priority Data

Aug. 19, 1991 [GB] United Kingdom ............ 9117879.8

[51] Int. Cl.5 .................... A23N 4/02; A47J 23/00
[52] U.S. Cl. ............................. 99/549; 99/556;
99/559; 99/560; 99/565
[58] Field of Search ............... 99/547, 549, 550, 555,
99/556, 559–561, 565, 566, 494; 30/113.1, 113.3

[56] References Cited

U.S. PATENT DOCUMENTS

| 405,118 | 6/1889 | Reibisch | 99/560 |
| 578,790 | 3/1897 | Trask | 99/556 |
| 1,047,786 | 12/1912 | Goldman | 99/556 |
| 1,235,706 | 8/1917 | McDaniel | 99/560 |
| 1,318,181 | 10/1919 | Schiemer | 99/560 |
| 2,196,772 | 4/1940 | Lachman | 99/559 |
| 2,463,854 | 3/1949 | Cowan | 99/547 |
| 2,552,971 | 5/1951 | Hoover | 99/561 |
| 2,730,149 | 10/1952 | Aguilar | |
| 3,411,556 | 11/1968 | Margaroli | 99/549 |
| 3,731,615 | 5/1973 | Margaroli et al. | 99/565 |
| 4,882,986 | 11/1989 | Diaz | 99/494 |

FOREIGN PATENT DOCUMENTS

| 85769 | 6/1894 | Fed. Rep. of Germany . | |
| 146425 | 11/1901 | Fed. Rep. of Germany . | |
| 3601079 | 7/1987 | Fed. Rep. of Germany | 99/547 |
| 2452903 | 10/1980 | France . | |
| 108037 | 12/1924 | Switzerland . | |
| 168975 | 5/1934 | Switzerland | 99/559 |

Primary Examiner—Timothy F. Simone
Attorney, Agent, or Firm—Townsend and Townsend Khourie and Crew

[57] ABSTRACT

A cherry pitter comprising a pitting station (24) adapted to support a cherry (88) having an opening 84 sized to allow passage of a pit (85), but not the cherry (88). A pit ejector (26) adapted to reciprocate along a longitudinal axis includes an elongate punch having a number of arms (50, 52, 54, 56) radiating out from the longitudinal axis, each arm extending beyond the proximal end of the punch to form a cruciform cross-section. One of the arms (56) has a substantially flat profile and the other three arms (50, 52, 54) have an undercut portion (66) of the same order of axial length as the diameter of a typical cherry. The punch is oriented so that the flat arm (56) projects towards a delivery passage (22). The delivery passage (22) has an arcuate channel that aligns the cherries and delivers them to the pitting station (24) one at a time. The elongate punch drives into the cherry (86) and pushes the pit through the outer flesh of the cherry (86) and through the opening (84) and into a pit chamber (94). The punch then pulls the cherry (86) back along the longitudinal axis so that the cherry (86) falls into a cherry bowl (13).

25 Claims, 6 Drawing Sheets

CHERRY PITTER

BACKGROUND OF THE INVENTION

1. Field of the Invention

This invention relates to a cherry pitter or de-stoner as such items are sometimes called.

2. Description of the Prior Art

Many types of cherry pitter are known and it is an object of the present invention to provide an improved version.

SUMMARY OF THE INVENTION

According to the invention in one aspect a cherry pitter comprises a pitting station at which a cherry is supported over an opening of a size to allow passage of a pit, but not a cherry, and a pit ejector reciprocatable across that station to press into and through a cherry at the station and push the pit through the flesh of the cherry and out through the opening, the pit ejector comprising an elongate punch having a cross-shaped cross-section with a number of arms radiating out from its longitudinal axis along which it is reciprocatable, each arm having a pointed tip spaced outwardly from the axis and an end inclined such that the end of the punch has a hollowed centre, at least some of the arms having an undercut portion along their length, that is to say, in a direction away from the tip, an initial portion followed by a portion of reduced height, preferably thereafter followed by a portion of increased height.

We have found that with such a cross-section to the pit ejector, there is the minimum of damage to the flesh of the cherry yet at the same time the pit can be ejected very effectively.

Preferably the initial portion of an arm adjacent the end is of progressively increasing length outwardly from the axis. The resulting inclined faces of the edges of the arms which are of increasing height from the axis cut gently through the flesh of the cherry. Also the tip and sides of the arms of the ejector enter the flesh by cleanly cutting the flesh and substantially without damaging or squashing the flesh.

The hollowed end of the pit ejector will engage over and centre on the pit even though there will be considerable irregularities as between one cherry and another as to the position and size of a pit.

The initial portions of the arms need not be very long, indeed they are preferably relatively short, and will generally only need to be sufficiently long in the axial direction to ensure that the tip of the ejector engages the pit before these parts of the arms have fully penetrated the flesh of the cherry.

Thereafter the undercut portion of reduced height is provided to support the tip and to keep the ejector and cherry aligned. By providing the undercut portions, however, the amount of friction between the ejector and the flesh of the cherry can be reduced and indeed these arms will follow in the cut made by the larger initial end and so will not damage the flesh of the cherry. The axial length of this undercut portion should be slightly less than the typical diameter of a cherry so that as the tip finally approaches the other side of the cherry, the subsequent portion of increased height will again engage in the cuts in the flesh already made by the tip. Therefore after the pit has been fully ejected, then the cherry will be engaged by both the tip and the subsequent enlarged portion to hold it reasonably steady and again prevent accidental damage to the flesh. Desirably the undercut portion is joined to the subsequent portion of increased height by any inclined portion so that there are no sharp or pointed edges to further damage the flesh of the cherry.

The cherry pitter of the invention can be in the form of a hand-held device as for example shown and described in copending United Kingdom Patent Application No 9019949.8. It is preferred however that the cherry pitter of the invention include means to deliver cherries one at a time and one after another to the pitting station and that means be provided to continuously reciprocate the pit ejector so that a relatively large number of cherries can be pitted one after another.

Such an arrangement can include an upper reservoir for fresh cherries which has a base gently sloping down to a delivery passage narrow enough to align the cherries into a line and deliver them one at a time to the pitting station. In this way cherries placed therein will roll progressively to the station until the reservoir becomes empty.

In addition a first open-topped chamber is provided beneath the pitting station to receive the pits whilst a second open-topped chamber is provided to receive the pitted cherries. According to another aspect of the invention, the axis of movement of the pit ejector is inclined to the upright so that the pit is pushed to one side and then as the ejector withdraws from the cherry it will pull the cherry to an opposite side clear of the pit and once the ejector become fully withdrawn from the cherry the latter can drop into the separate second chamber.

Therefore according to another aspect of the invention there is provided a cherry pitter comprising a pitting station at which a cherry is supported over an opening of a size to allow passage of a pit but not a cherry, and a pit ejector reciprocatable across that station to press into and through a cherry at the station and push the pit through the flesh of the cherry and out through the opening, the pit ejector being reciprocatable along a path which is inclined to the upright, whereby the pit will be ejected at the advanced position of the ejector and the pitted cherry can be released from the ejector near to its retracted position and so separate from the pit.

In one preferred embodiment of the invention the first chamber is removably positioned within the second chamber and so can be removed therefrom at the end of a pitting operation to separate the pits completely from the now pitted cherries so avoiding their accidental mixing.

The path of movement of the pit ejector can for example be at an angle of from 20° to 60° to the upright, an angle of 35° to 40° being preferred.

In one preferred embodiment of the invention the ejector device has four arms each equally spaced around the axis by 90°. According to another aspect of the invention however, it is found when the ejector mechanism is used in a cherry pitter of the type where the cherries form a queue or line waiting to move into the pitting station it is desirable that the arm against which the next cherry waiting to be pitted abuts and rests should have a substantially flat profile. Therefore it should be undercut as noted above since, by providing a flat profile against which the cherry rests, this avoids the possibility of the surface of the next cherry being damaged as the ejector moves to a retracted position ready to eject a pit from the cherry which then rolls into place. That arm should however have a pointed tip at its end as described above which is spaced from the axis and from the other tips on the other arms.

In one preferred embodiment of the invention it is desirable that the base of the pitting station be constituted by means of a resilient member having an opening whose cross-section corresponds to that of the end of the ejector. In this way, the end of the ejector can penetrate that opening without damage yet under normal circumstances the resilient member will provide support for the cherry prior to and during the ejection of the pit. However the opening can be distended as the pit is pressed against it to allow the pit to pass through and this ensures good separation of the pit from the flesh and, should the points at the end of the ejector penetrate the pit and so the pit become adhered to the ejector, this will also assist in removing the pit from the end of the ejector. In that connection it is desirable that the tip of the ejector penetrate completely through the cherry itself and also at least partially through the opening into the resilient member.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
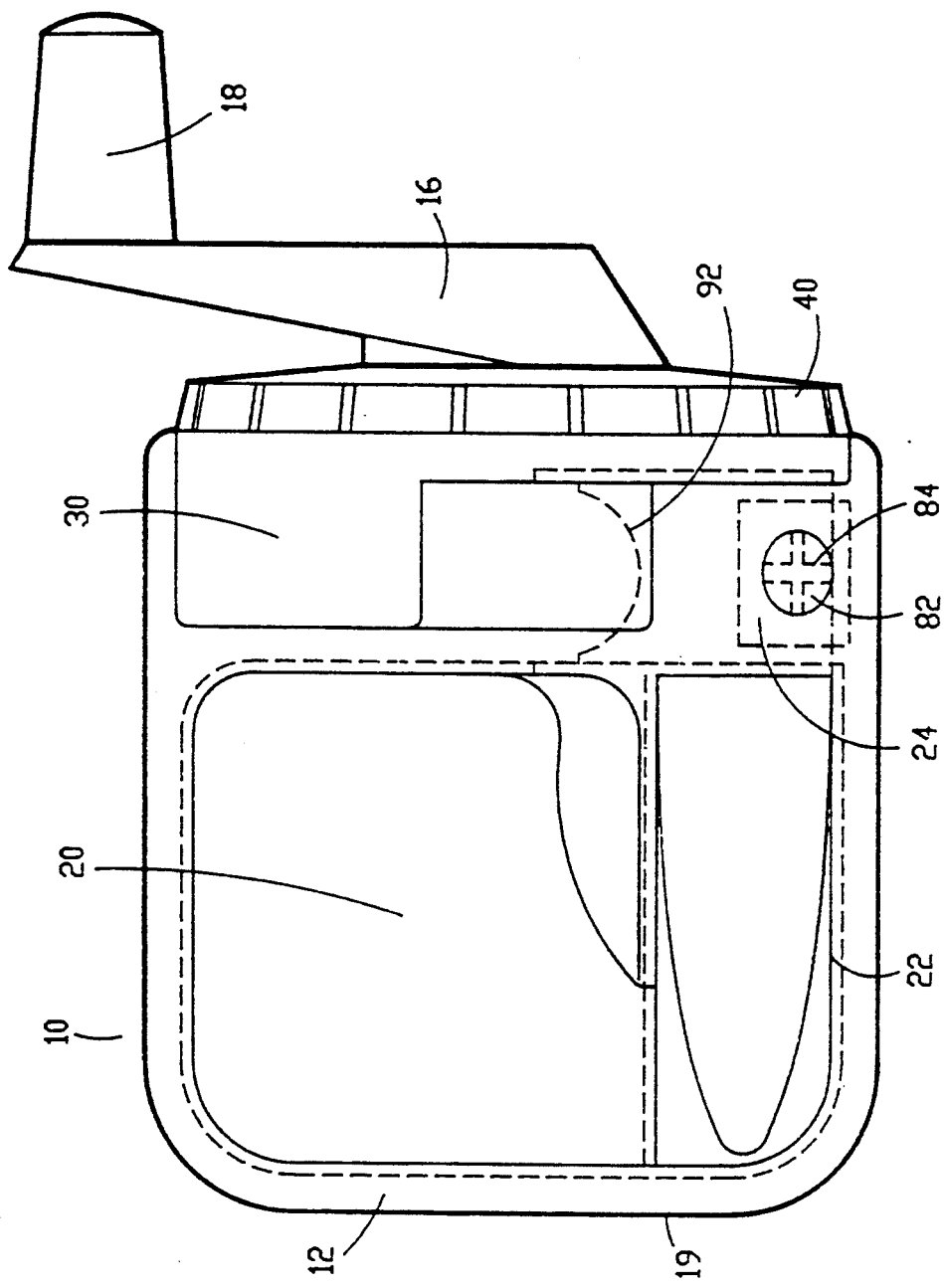
FIG. 1 is a plan view of a cherry pitter according to the invention.

The cherry pitter 10 shown in the drawings includes an upper portion 12 which supports the pit ejecting mechanism as will be described and this is supported over an open topped bowl or chamber 13 which receives the separated pits and cherries. The upper portion 12 includes a handle 16 and a rotatable knob 18 at the end of the arm of the handle for operating the pit ejecting mechanism.

The portion 12 has a downwardly extending rim 19 around its periphery which extends over and encompasses the top edge of the open topped bowl 13. Projecting inwardly from the rim 19 are flanges 19a and the lower shoulders of these rest on the upper edge 13a of the bowl 13. Therefore during use the upper portion 12 rests firmly on the bowl 13.

Figure 2:
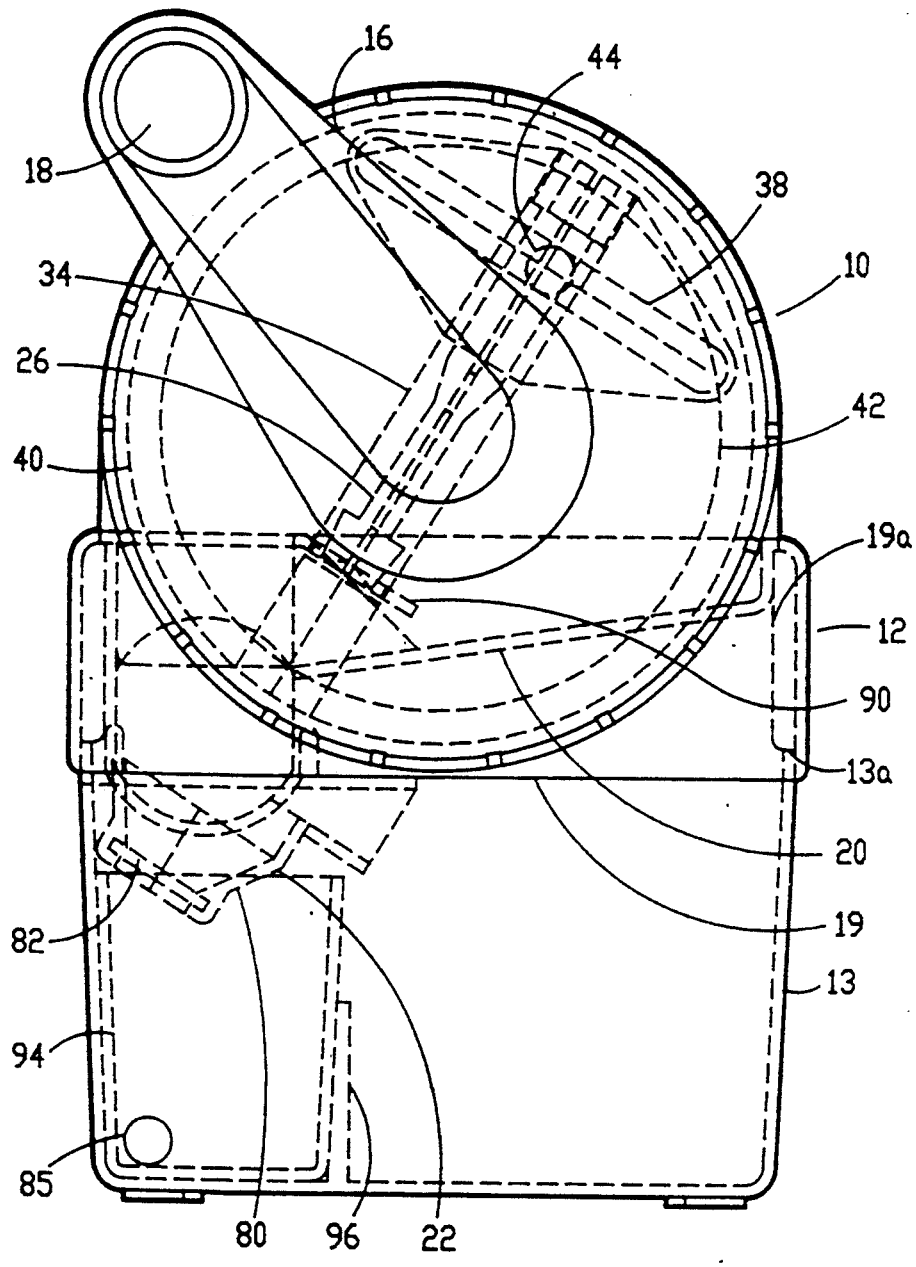
FIG. 2 is a side view of the cherry pitter with the ejector in the retracted position.
Figure 3:
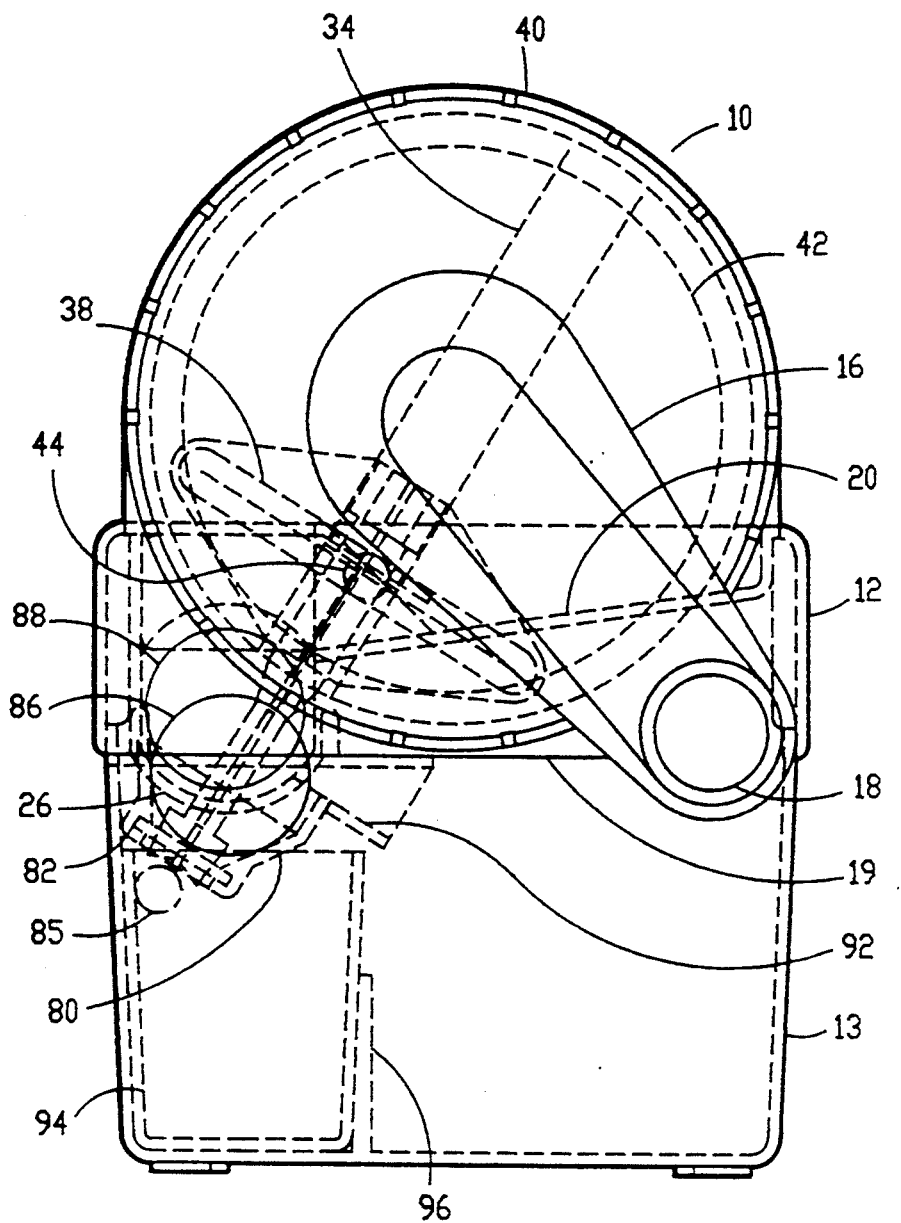
FIG. 3 is a view similar to FIG. 2 but showing the ejector in the advanced, pit-ejecting position.
Figure 4:
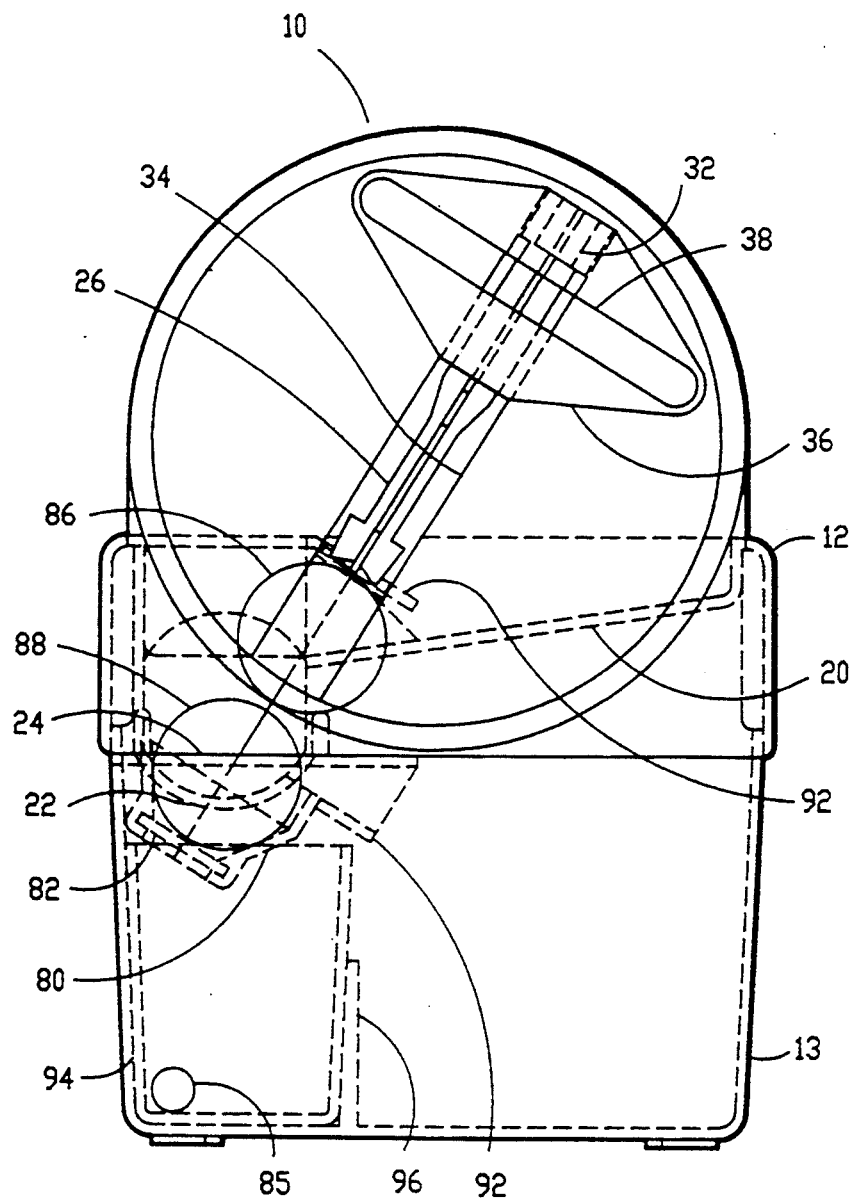
FIG. 4 is a view similar to FIG. 2 but with the handle removed.
Figure 5:
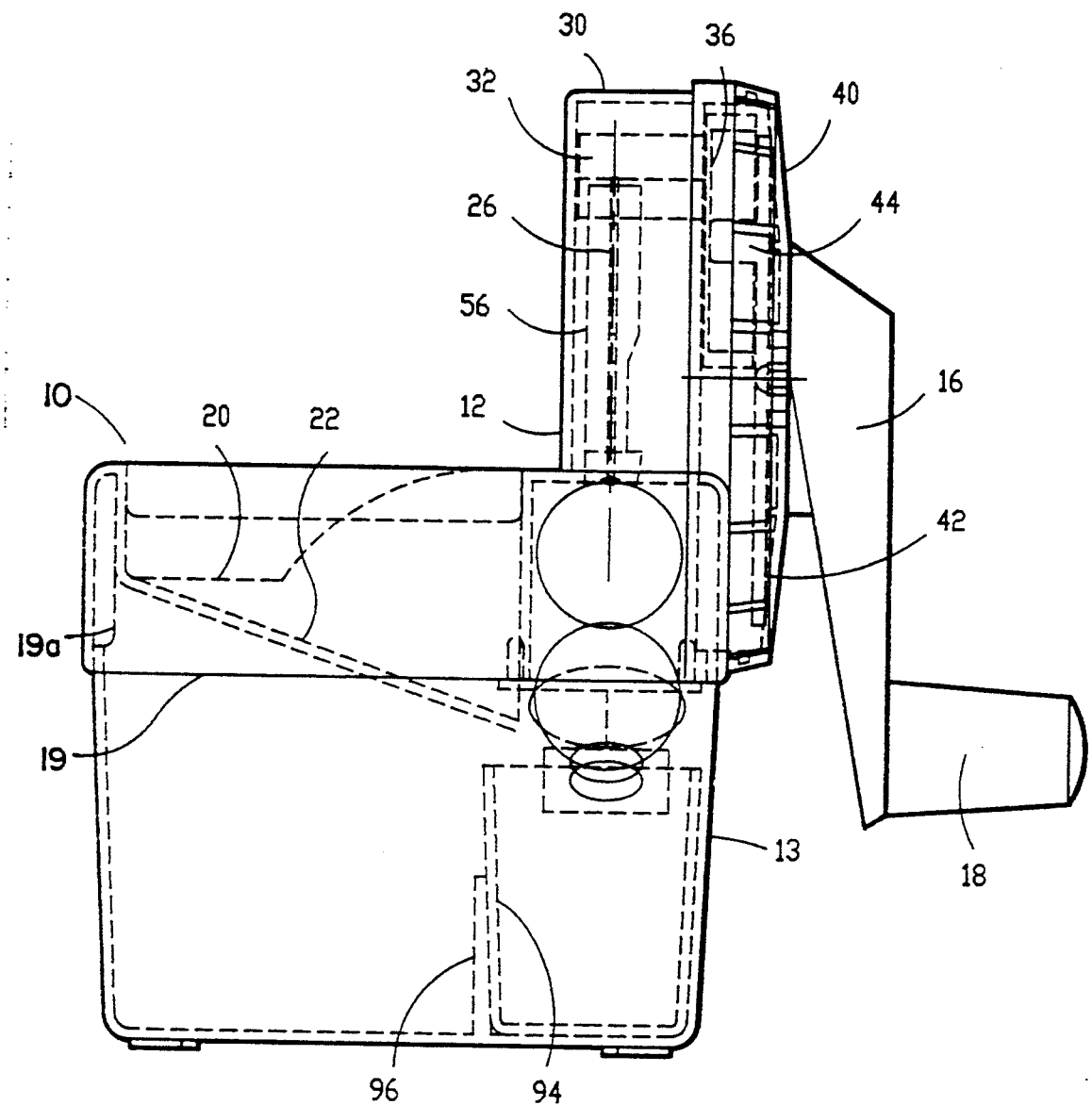
FIG. 5 is a view from one end of the cherry pitter.

The portion 12 includes a bowl region 20 into which cherries to be pitted are placed. As best seen in FIGS. 2, 3 and 4, this region 20 is inclined in a direction towards a passage 22 which is of approximately the width of a typical cherry. In turn this passage 22 is inclined downwardly, as is best seen in FIG. 5, so as to feed the cherries to a pitting station 24 (see FIG. 1). It is at the pitting station that the cherries are then contacted by an ejector 26 and the pits are removed. Therefore when a number of fresh cherries are placed in the bowl region 20 they will roll gently under gravity across the area 20 into the passage 22 and then down the passage 22 to the station 24. The passage 22 includes an arcuate channel portion tapering away from the pitting station 24 as shown in FIGS. 1 and 4. In the passage 22 they will tend to be aligned in a row one behind the other and so will only be received one at a time at the pitting station 24.

The portion 12 includes an upstanding casing 30 which houses the operating mechanism and supports the handle 16. This includes a support block 32 to which the ejector 26 is joined. The support block is itself constrained to move up and down an inclined guide 34. Attached to the block 32 and projecting forwardly of the guide 34, is a cam member 36 which includes a slot 38 extending transversely relative the included guide 34. The ejector 26 is capable of being moved between a retracted position, as shown for example in FIGS. 2 and 4 where it and the cam member 36 are moved to a top right position in the sense seen in FIG. 4, and an advanced ejecting position as shown for example in FIG. 3. In the latter position the ejector 26 and the cam member 36 are in a lower left position in the sense viewed in FIG. 3 and it will be noted that in this position the ejector 26 extends completely across the pitting station 24 whereas in the retracted position shown in the FIGS. 2 and 4 it is completely clear of this station.

The handle 16 is rotatably supported by means of a cover 40 attached to the casing 30 and the handle 16 is joined on the inside of the cover to a circular rotatable plate 42.

Integrally formed with the circular plate 42 is a cam pin 44. This projects into the slot 38 and can slide from one end to the other end thereof as the handle is rotated. In this way it will move the cam member 36 up and down along the inclined guide 34 as the handle is rotated around a circle. The orientation of the pin 44 on the plate 42 is such that, when the pit is being pushed from the flesh of the cherry, i.e. the hardest part of the operation, the handle is being pushed downwardly.

Figure 7:
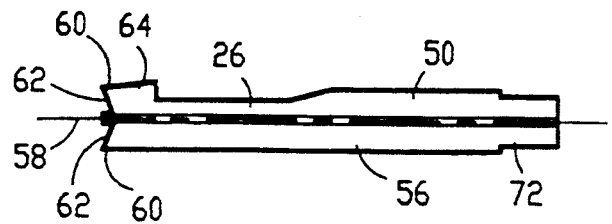
FIG. 7 is a view similar to FIG. 6 but taken at right angles thereto.
Figure 6:
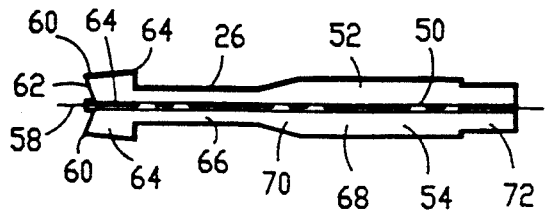
FIG. 6 is an enlarged detail of the ejector.
Figure 8:
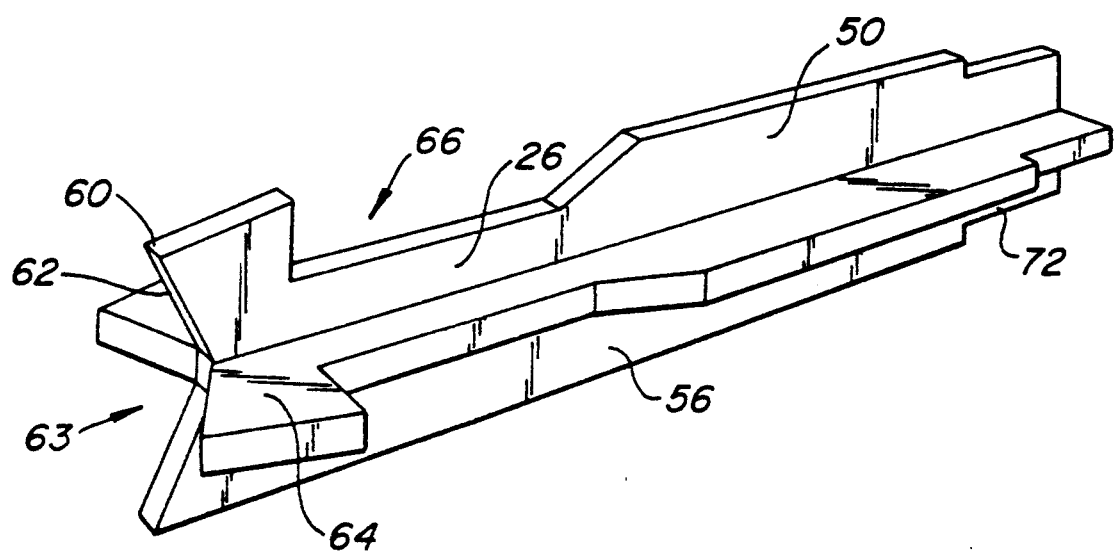
FIG. 8 is a prospective view of the ejector shown in FIGS. 6 and 7.

The ejector 26 is best shown in FIGS. 6, 7, and 8. It comprises four arms 50, 52, 54, 56 which are arranged to radiate out at 90° to one another relative the axis 58 of the ejector. At its pit contacting end each arm has an identical point 60. These points 60 are spaced equally from the axis 58. In addition the ends 62 of each of the arms are inclined so that the end of the ejector has a hollow. In this way the end can engage over the pit of a cherry center 63.

Each of the arms 50, 52, 54 is identical whilst the arm 56 differs for reasons which will be explained.

Each arm 50 to 54 includes an initial portion 64 which tapers slightly in a direction towards the tip. It is this portion 64 which initially enters the flesh of the cherry following the tip 60 and cuts the flesh of the cherry. Following the initial portion is an undercut, inner portion 66 of reduced height relative the axis 58. The overall extent of this portion 66 approximates the diameter of a cherry and, because of the smaller size of the arms in this portion 66, there is therefore less contact between the arms and the flesh of the cherry when the ejector is penetrating the cherry and so less chance of damaging the flesh of the cherry. Finally the arms 50, 52, 54 have at their rear a portion 68 of increased height relative the axis 58 except that this height is still slightly less than the maximum height of the portions 64. The portions 66 and 68 are in turn joined by an inclined portion 70. All of the arms 50, 42, 44 and 56 have a rear end portion 72 which fixes into the block 32 to join the ejector 26 to the latter.

By contrast with the arms 52, 52, and 54, the arm 56 is of constant height relative the axis 58 the whole way along its length apart from the rear portion 72. When the ejector is mounted in the pitter 10, it will be noted from FIG. 5 that this arm 56 faces the passage 22. Because it presents a constant flat surface to the incoming cherry it does not trap or mark or cut the skin of the next cherry waiting to arrive at the pitting station as it is retracted from the advance position shown in FIG. 3 to the retracted position shown in FIG. 2.

The pitting station 24 is defined at its lower end by means of a wall 80 forming part of the portion 12 and a resilient material flap 82 which, as best shown in FIG. 1, includes a cross shaped opening 84 of a shape corresponding to the shape of the ejector 26. In use a row of cherries forms in the passage 22 and, when the station 24 is empty, the first cherry in the row will drop from the passage 22 into the station 24 and will rest against the wall 80 and flap 82. Then as the ejector 26 is advanced upon rotating the handle 16, the ejector 26 will advance towards the cherry and engage it. As it continues to advance it will penetrate the flesh of the cherry and its hollowed out end will engage over the pit. The arms 50, 52, 54 and 56 cut their way through the flesh of the cherry and also support the cherry as the pit is pushed through the end of the cherry and eventually out through the flesh and through the cross shaped opening in the flap 82. When the ejector reaches its fully advanced position its tip has penetrated completely through the cherry and also engages into the opening 84 in the flap 82 and so ensures that the pit is fully ejected from the station 24. This situation is best shown in FIG. 3 where a pit 85 is shown as having been just pushed through the flap 82 from a cherry 86 which is shown with the ejector 26 penetrating fully across it. The next cherry 88 is shown in the passage 22.

As the user continues to turn the handle, the ejector 26 will be withdrawn back to the initial position shown in FIGS. 2 and 4. Initially the ejector will carry the cherry with it towards the upper most position. However, the cherry will eventually abut against a wall 90 through which the ejector extends. When it does this the wall 90 will prevent further upward movement of the cherry so the ejector will be withdrawn progressively from the cherry. Eventually the pitted cherry will be released and this will drop downwardly. Whilst the cherry is being withdrawn there comes a point where the next cherry 88 (FIG. 3) existing in the passage 22 is able to drop past the now pitted cherry 86 into the station 24. Once the pitted cherry 86 becomes released from the ejector 26 it drops down and it will be effectively pushed towards the right in the sense seen in FIG. 4 when it contacts the cherry 88. It therefore falls past this and down a chute 92 forming an extension of the wall 80 into the bowl 13. In the absence of a further cherry 88 the same effect is achieved since the pitted cherry will in any case fall against the chute 92 and be directed into the main portion of the bowl 13.

Therefore, because the axis of movement of the ejector 26 is inclined according to one aspect of the invention, it is possible to eject the pits in one direction and the pitted cherries in the other direction.

The bowl 13 on which the upper portion 12 rests will receive the pitted cherries. However, according to another aspect of the invention, within it is a separate, removable bowl or chamber 94 for the pits. This is retained in position within the larger bowl 13 by projecting flanges 96. However the bowl 94 can easily be removed to empty it of accumulated pits and so separate them readily from the pitted cherries at the end of a pitting operation. In that connection the upper portion 12 will of course be first removed from the bowl 13 to obtain access.

Although the term "cherry" has been used herein for simplicity and convenience, the invention is applicable to the de-stoning or pitting of other types of fruit having a pit or stone and so that term is to be construed broadly to cover all such types of fruit, unless the context specifically requires otherwise.

I claim:

1. A pitter for removing a pit from a fruit with an outer flesh comprising:
    a platform adapted to support the fruit having an opening sized to allow passage of the pit, the opening also sized to prevent passage of the fruit;
    a pit ejector adapted to reciprocate along a longitudinal axis, the ejector comprising an elongate punch with a proximal end near the platform, the punch having a first arm and at least a second arm radiating out from the longitudinal axis, the arms each being inclined from the proximal end of the punch to form a hollow center, the outer edge of the first arm having a substantially flat profile and the second arm having front, inner and rear portions, the front portion extending farther from the longitudinal axis than the inner and rear portions;
    means for reciprocating the pit ejector so that the elongate punch drives through the fruit and pushes the pit through the outer flesh of the fruit and through the opening;
    an upper reservoir for housing a plurality of fruits;
    a delivery passage connecting the upper reservoir to the platform, the delivery passage being sized and positioned to align the fruits and to deliver the fruits from the upper reservoir onto the platform one at a time; and
    the punch being oriented so that the first arm projects radially towards the delivery passage and the second arm is prevented from contacting the fruits while the fruits are in the delivery passage.

2. A device according to claim 1 wherein the front portion of the second arm tapers toward the proximal end of the punch.

3. A device according to claim 1 wherein the rear portion extends farther from the longitudinal axis than the inner portion.

4. A device according to claim 1 wherein the inner portion of the second arm has an axial length approximately equal to a diameter of the fruit.

5. A device according to claim 1 wherein the elongate punch comprises three second arms and one first arm equally spaced around the longitudinal axis.

6. A pitter for removing a pit from a fruit with an outer flesh comprising:
    a platform adapted to support the fruit having an opening sized to allow passage of the pit, the opening also sized to prevent passage of the fruit;
    a pit ejector reciprocal along a longitudinal axis, the ejector comprising an elongate punch with a proximal end near the platform, the punch having at least two arms radiating out from the longitudinal axis, the arms each being inclined from the proximal end of the punch to form a hollow center;

a first chamber positioned beneath the opening in the platform to receive the pit;

a second chamber positioned to receive the fruit after the pit has been removed; and means for reciprocating the pit ejector between a forward position near the platform and a retracted position away from the platform, the pit ejector being movable from the retracted position to the forward position to drive the elongate punch through the fruit and push the pit through the outer flesh of the fruit and through the opening into the first chamber, the pit ejector being movable from the forward position back to the retracted position to pull the fruit towards the retracted position wherein the first chamber is positioned within the second chamber.

7. A device according to claim 6 wherein the longitudinal axis of the pit ejector is inclined so that the fruit will fall into the second chamber after being pulled from the platform.

8. A device according to claim 6 wherein one of the arms is a first arm with a substantially flat profile and at least one other arm is a second arm having front, inner and rear portions, the front portion extending farther from the longitudinal axis than the inner and rear portions, the front portion tapering towards the proximal end of the punch.

9. A device according to claim 8 wherein the inner portion of the second arm has an axial length approximately equal to a diameter of the fruit.

10. A device according to claim 8 wherein the rear portion extends farther from the longitudinal axis than the inner portion.

11. A device according to claim 10 wherein the inner and rear portions are joined by an incline.

12. A device according to claim 8 wherein the elongate punch comprises three second arms and one first arm equally spaced around the longitudinal axis.

13. A pitter for removing a pit from a fruit with an outer flesh comprising;

a pit ejector adapted to reciprocate along a longitudinal axis, the ejector comprising an elongate punch with a proximal end near the fruit, the punch having first and second arms radiating out from the longitudinal axis, the arms being inclined from the proximal end of the punch to form a hollow center the first arm having a substantially flat profile and the second arm having front, inner and rear portions, the front portion extending farther from the longitudinal axis than the inner and rear portions, the front portion tapering towards the proximal end of the punch;

a platform adapted to support the fruit, the platform including a resilient member having an opening sized to allow passage of the pit ejector, the resilient member being adapted to allow the pit ejector to push the pit through the opening and to prevent passage of the fruit;

means for reciprocating the pit ejector between a forward position near the platform and a retracted position away from the platform, the pit ejector being movable from the retracted position to the forward position to drive the elongate punch through the fruit and push the pit through the outer flesh of the fruit and through the opening in the resilient member.

14. A device according to claim 13 wherein the reciprocating means drives the proximal end of the punch through the opening in the resilient member.

15. A device according to claim 13 wherein the inner portion of the second arm has an axial length approximately equal to a diameter of the fruit.

16. A device according to claim 13 wherein the rear portion extends farther from the longitudinal axis than the inner portion.

17. A device according to claim 16 wherein the inner and rear portions are joined by an incline.

18. A device according to claim 13 wherein the elongate punch comprises three second arms and one first arm equally spaced around the longitudinal axis.

19. A pitter for removing a pit from a fruit with an outer flesh comprising:

a platform adapted to support the fruit having an opening sized to allow passage of the pit, the opening also sized to prevent passage of the fruit;

a pit ejector adapted to reciprocate along a longitudinal axis, the ejector comprising an elongate punch with a proximal end near the platform, the punch having at least two arms radiating out from the longitudinal axis, the arms each being inclined from the proximal end of the punch to form a hollow center;

means for reciprocating the pit ejector so that the elongate punch drives through the fruit and pushes the pit through the outer flesh of the fruit and through the opening;

an upper reservoir for housing a plurality of fruits; and a delivery passage connecting the upper reservoir to the platform, the delivery passage having an arcuate channel tapering away from the platform, the channel being sized and positioned to align the fruits and to deliver the fruits from the upper reservoir onto the platform one at a time.

20. A device according to claim 19 wherein one of the arms is a first arm with a substantially flat profile and at least one other arm is a second arm having front, inner and rear portions, the front portion extending farther from the longitudinal axis than the inner and rear portions, the front portion tapering towards the proximal end of the punch.

21. A device according to claim 20 wherein the inner portion of the second arm has an axial length approximately equal to a diameter of the fruit.

22. A device according to claim 20 wherein the rear portion extends farther from the longitudinal axis than the inner portion.

23. A device according to claim 22 wherein the inner and rear portions are joined by an incline.

24. A device according to claim 20 wherein the elongate punch comprises three second arms and one first arm equally spaced around the longitudinal axis.

25. A device according to claim 20 wherein the punch is oriented so that the first arm projects radially towards the delivery passage and the second arm is prevented from contacting the fruits while the fruits are in the delivery passage.

* * * * *